Patented Jan. 7, 1941

2,227,496

UNITED STATES PATENT OFFICE 2,227,496

INSECTICIDAL COMPOSITION

Hubert G. Guy, Newark, Del., assignor to E. I. du Pont de Nemours & Company, Wilmington, Del., a corporation of Delaware No Drawing. Application April 28, 1938,
Serial No. 204,740

10 Claims. (Cl. 167—24)

This invention relates to compositions of matter useful in controlling plant pests such as insects, fungi, and similar organisms, and provides means for increasing the effectiveness of rotenone and pyrethrum insecticides. More particularly this invention relates to compositions adapted for application to plant foliage and provides for effective control of such persistent and resistant pests as red spiders. Specifically I have found that thiuram sulfides exert a pronounced effect upon the toxicity of rotenone and pryethrum insecticides, and not only materially increase the efficiency of such insecticides but also impart fungicidal and ovicidal properties thereto.

A wide variety of rotenone and pyrethrum insecticides are in common use and are among the most efficient insecticides available. These insecticides, however, when applied in concentrations required for effective control are quite expensive and, moreover, in many instances fail to provide the proper measure of control.

At the present time, for example, there is no entirely satisfactory control for red spiders on tender foliaged plants such as roses. Quite recently rose growers have begun to use sprays containing derris alone or derris together with sulfonated castor oil, but, while obtaining results somewhat superior to the earlier methods of control, have found it necessary to make frequent applications, about every four to seven days, with high pressure spray equipment. The results obtained, however, are only slightly better than those obtainable by spraying water alone and, moreover, the frequency of application strongly encourages mildew to grow on the plants.

I have now found that excellent control of red spider can be obtained with rotenone insecticides including cube, derris, and extractives when a small amount of a thiuram sulfide is included in the spray mixture. By incorporating a small amount of a thiuram sulfide in a rotenone insecticide I am able in many instances to double its effectiveness and at the same time I am able materially to reduce the number of applications required. In many instances a single application will suffice since my novel composition not only effectively kills the adult spiders but also destroys the eggs. This not only prevents reinfestation but removes one of the principal causes of mildew. Moreover, any mildew which is present at the time of spraying is effectively checked.

While the thiuram sulfides have proved to be especially effective additions to rotenone insecticides for controlling red spider my invention is in no wise limited in this respect as I have found that similarly improved results are obtained with other plant pests such as aphids and thrips, and that the toxicity of pyrethrum insecticides may be increased in the same manner.

The effect of the thiuram sulfides in increasing the toxicity of pyrethrum and rotenone insecticides does not appear to be dependent upon any particular form of these insecticides. For example, the effect has been observed with ground derris, ground cube, ground pyrethrum flowers, camphor oil extracts of derris, and hydrocarbon oil extracts of pyrethrum flowers. Certain oils, however, have been found to enhance the efficiency of the base insecticide and superior results may be obtained by including a suitable oil along with the thiuram sulfide.

A large variety of thiuram sulfides are suitable for the purposes of this invention. The following may be mentioned by way of example: Tetraethylthiuram monosulfide, tetramethylthiuram disulfide, tetramethylthiuram monosulfide, dimethylthiuram disulfide, symmetrical dimethyldiphenylthiuram disulfide, tetrabutylthiuram monosulfide, tetracyclohexylthiuram disulfide, tetrabenzylthiuram disulfide, tetraisobutylthiuram disulfide, methylene thiuram disulfide, dimorpholine thiuram disulfide, tetraphenylthiuram disulfide, and tetra-(2-ethylhexyl)-thiuram disulfide.

The thiuram sulfide may be incorporated into rotenone or pyrethrum insecticides in any suitable manner. Thus, the several ingredients may be dispersed in aqueous media to form dispersions suitable for spraying, or dissolved in a common solvent to provide solutions suitable for spraying as such or in aqueous dispersions. Both the dispersions and the solutions may be prepared in concentrated form suitable for use in preparing sprays. The ingredients may also be prepared in the form of dispersible powders suitable for preparing sprays or for application to foliage in the form of a dust. Other materials such as diluents, spreaders, and adhesives, as well as other insecticidal agents, may be included.

In practice I prefer to employ a suitable oil, preferably a fatty acid oil such as coconut oil, castor oil, corn oil, soybean oil, peanut oil, and olive oil, as I have found that the toxicity, especially of rotenone insecticides, is materially increased by the presence of such oils. For example, I have found that castor oil is much more effective in increasing the toxicity of derris than the sulfonated castor oil heretofore employed. Straight hydrocarbon oils exert a like influence on the toxicity of a rotenone insecticide, especially the powdered form such as ground derris and ground cube, and in general any insoluble oil will exert a like effect. By insoluble oils I mean oils like castor oil and unlike sulfonated castor oil which are not self-dispersible in water.

The insoluble oil may be emulsified with any suitable emulsifying agent and dispersed in the spray mixture. Preferably, however, I simply mix the insoluble oil with powdered derris or powdered cube in proportions to give dispersible powder. When the oil is mixed with derris or cube in this manner I have found that an emulsifying agent is unnecessary as the saponin in the ground derris or ground cube operates effectively to emulsify the oil when the mixture is dispersed in water. When a thiuram sulfide is also incorporated I may dissolve the thiuram sulfide in the oil and for this purpose prefer to employ such freely oil soluble sulfides as tetraethylthiuram monosulfide and tetra-(2-ethyl-hexyl)-thiuram disulfide.

The following examples, which are to be understood by way of illustration only, will serve to illustrate the effect of thiuram sulfides and insoluble oils on rotenone and pyrethrum insecticides. Unless otherwise noted, all sprays include a spreading and sticking agent in a final solution of 1–2000 (0.05%). The spreading and sticking agent was prepared according to the disclosure in the Tisdale and Flenner Patent Number 2,128,973, granted September 6, 1938. The derris used contained 4 per cent rotenone and 12 per cent extractives. The rotenone extract was a brown camphor oil extract containing 5 per cent rotenone and 20 per cent total extractives. The cube contained 4 per cent rotenone and 14 per cent total extractives.

EXAMPLE 1

Tetraethylthiuram monosulfide dissolved in an equal quantity of coconut oil was emulsified with sufficient quantity of water to form a 50 per cent emulsion. Solubilized casein was employed as an emulsifying agent. Sprays were prepared from the above composition with and without derris and were applied to bean plants heavily infested with red spider. The results as compared with derris alone are given in the following table:

TABLE I
Red spider on bean plants

| Composition | Concentration | | | Per cent kill | Relative concentration* |
|---|---|---|---|---|---|
| | Derris | Oil | Sulfide | | |
| Derris | 16–3200 | | | 52 | 32 |
| Do | 8–3200 | | | 22 | 16 |
| Coconut oil | | 4–3200 | | 59 | 16 |
| Tetraethylthiuram monosulfide | | | 4–3200 | | |
| Derris | 6, 4–3200 | | | 98 | 16.8 |
| Coconut oil | | 1–3200 | | | |
| Tetraethylthiuram monosulfide | | | 1–3200 | | |

*The relative concentration in this and in the subsequent tables is given as the number of parts in 6400 of the total active ingredients listed under concentration.

These data show that by including a small amount of tetraethylthiuram monosulfide the toxicity of the derris is materially increased. Doubling the concentration of the derris had materially less effect than the substitution of as little as 1–3200 of the thiuram sulfide. As will be shown later, the coconut oil is responsible for part of the improvement noted but is in no respect the equivalent of the thiuram sulfide.

In the test summarized in the following table all the sprays were more effective so that a better indication of the effect of the thiuram sulfide in various degrees of concentration is indicated:

TABLE II
Red spider on bean plants

| Composition | Concentration | | | Per cent kill | Relative concentration |
|---|---|---|---|---|---|
| | Derris | Oil | Sulfide | | |
| Derris | 16–6400 | | | 62 | 16 |
| Do | 16–6400 | | | | |
| Coconut oil | | 4–6400 | | 100 | 24 |
| Tetraethylthiuram monosulfide | | | 4–6400 | | 20 |
| Derris | 16–6400 | | | | |
| Coconut oil | | 2–6400 | | 100 | 20 |
| Tetraethylthiuram monosulfide | | | 2–6400 | | |
| Derris | 16–6400 | | | | |
| Coconut oil | | 1–6400 | | 98 | 18 |
| Tetraethylthiuram monosulfide | | | 1–6400 | | 25 |
| Derris | 8–6400 | | | | |
| Coconut oil | | 2–6400 | | 100 | 12 |
| Tetraethylthiuram monosulfide | | | 2–6400 | | |
| Derris | 8–6400 | | | | |
| Coconut oil | | 1–6400 | | 84 | 10 |
| Tetraethylthiuram monosulfide | | | 1–6400 | | |

These data show the remarkable effect of small amounts of tetraethylthiuram monosulfide in increasing the efficiency of derris sprays. Even with as little as one part of tetraethylthiuram sulfide in 6400 almost complete control is obtained with derris at 1–400. Even with derris diluted to 1–800 superior results were obtained with the same amount of the thiuram sulfide as compared with derris at 1–400.

EXAMPLE 2

The tests summarized in the following table illustrate the effect of oils. The oils were prepared in the form of a 50 per cent emulsion using a solubilized casein as an emulsifying agent and added to water suspensions of the derris in the concentrations noted. Oil emulsions of tetraethylthiuram monosulfide as described in Example 1 were added to a water suspension of derris in proportions to be equivalent to replacing one-half the oil with thiuram sulfide.

TABLE III
Red spider on bean plants

| Composition | Concentration | | | Per cent kill | Relative concentration |
|---|---|---|---|---|---|
| | Derris | Oil | Sulfide | | |
| Derris | 16–6400 | | | 38 | 16 |
| Do | 6–6400 | | | | |
| Coconut oil | | 2–6400 | | 54 | 8 |
| Derris | 6–6400 | | | | |
| Coconut oil | | 1–6400 | | 86 | 8 |
| Tetraethylthiuram monosulfide | | | 1–6400 | | |
| Derris | 6–6400 | | | | |
| Castor oil | | 2–6400 | | 53 | 8 |
| Derris | 6–6400 | | | | |
| Castor oil | | 1–6400 | | 81 | 8 |
| Tetraethylthiuram monosulfide | | | 1–6400 | | |
| Derris | 6–6400 | | | | |
| Soybean oil | | 2–6400 | | 55 | 8 |
| Derris | 6–6400 | | | | |
| Soybean oil | | 1–6400 | | 76 | 8 |
| Tetraethylthiuram monosulfide | | | 1–6400 | | |

These data show that while a substantial improvement is obtained by the oil emulsion alone, a still further improvement is obtained by replacing one-half the oil with the thiuram sulfide. It was observed also that when derris plus the oil alone were employed reinfestation occurred rapidly after several days, whereas when the thiuram sulfide was included reinfestation was markedly retarded, indicating that the composition containing the thiuram sulfide not only destroyed the adult spiders but also their eggs.

The following table illustrates similar results under conditions in which more effective control was obtained with all compositions. The thiuram sulfide was added in the form of the coconut oil emulsion described in Example 1 and also in the form of a dry powder containing 10 per cent tetraethylthiuram monosulfide and 90 per cent Bancroft clay. In both cases 100 per cent control was obtained as compared with only partial control for the derris alone or the derris together with coconut oil. Here again the coconut oil alone improved the effectiveness of derris, but the thiuram sulfide was still more effective even at one-half the concentration of coconut oil. Also, it may be noted that replacing half the coconut oil with thiuram sulfide gave superior results.

TABLE IV

Red spider on cucumber plants

| Composition | Concentration | | | Per cent kill | Relative concentration |
|---|---|---|---|---|---|
| | Derris | Oil | Sulfide | | |
| Derris | 4-1600 | | | 64 | 16 |
| Do | 4-1600 | | | | |
| Coconut oil | | 1-1600 | | 100 | 24 |
| Tetraethylthiuram monosulfide | | | 1-1600 | | |
| Derris | 4-1600 | | | | |
| Coconut oil | | 2-1600 | | 75 | 24 |
| Derris | 4-1600 | | | | |
| Tetraethylthiuram monosulfide | | | 1-1600 | 100 | 20 |

EXAMPLE 3

The tests illustrated in the following table show the effect of other thiuram sulfides on the toxicity of derris. The two methyl thiuram sulfides were prepared in the form of dispersible powders containing 80 per cent thiuram sulfide and about 20 per cent clay, and the tetra-(2-ethylhexyl)-thiuram disulfide was prepared as a coconut oil emulsion in substantially the same manner as described in Example 1.

TABLE V

Red spider on cucumber plants

| Composition | Concentration | | | Per cent kill | Relative concentration |
|---|---|---|---|---|---|
| | Derris | Oil | Sulfide | | |
| Derris | 4-1600 | | | 64 | 16 |
| Do | 4-1600 | | | | |
| Tetramethylthiuram disulfide (clay) | | | 2-1600 | 87 | 24 |
| Derris | 4-1600 | | | | |
| Coconut oil | | 1-1600 | | 100 | 24 |
| Tetra-(2-ethylhexyl)-thiuram disulfide (emulsion) | | | 1-1600 | | |
| Derris | 4-1600 | | | | |
| Tetramethylthiuram monosulfide (clay) | | | 1-1600 | 88 | 20 |

No comparative controls were run on the thiuram sulfides alone. In other tests, however, tetramethylthiuram disulfide (clay) at 1-1600 gave 5 per cent kill, tetra methyl thiuram monosulfide (clay) at 1-1600 gave 1 per cent kill, and tetra-(2-ethylhexyl)-thiuram disulfide (emulsion) at 1-1600 gave 40 per cent kill. While these data are not strictly comparable they indicate that control obtainable by thiuram sulfides alone is relatively ineffective.

EXAMPLE 4

Similar tests were conducted on Aphis rumicis on nasturtiums. The results are given in the following table:

TABLE VI

Aphids on nasturtium plants

| Composition | Concentration | | | Per cent kill | Relative concentration |
|---|---|---|---|---|---|
| | Derris | Oil | Sulfide | | |
| Derris | 20-10000 | | | 99 | 12.8 |
| Do | 10-10000 | | | 75 | 6.4 |
| Coconut oil | | 5-10000 | | | |
| Tetraethylthiuram monosulfide (emulsion) | | | 5-10000 | 38 | 6.4 |
| Derris | 10-10000 | | | | |
| Coconut oil | | 2.5-10000 | | 100 | 9.6 |
| Tetraethylthiuram monosulfide (emulsion) | | | 2.5-10000 | | |
| Derris,* 7 parts | 7-9000 | | | | |
| Tetraethylthiuram monosulfide,* 2 parts | | | 2-9000 | 100 | 6.4 |
| Derris,* 7 parts | 7-9000 | | | | |
| Coconut oil,* 1 part | | 1-9000 | | 100 | 6.4 |
| Tetraethylthiuram monosulfide,* 1 part | | | 1-9000 | | |

*These compositions were prepared as described in Example 5.

These data show that the improvement in toxicity over derris by the addition of a small amount of thiuram sulfide is not confined to red spiders and that similar improvement may be obtained in connection with other plant pests. It is significant to note and compare the first and last two compositions in this table. The last two, tho containing only about a third as much derris and only one and two parts in nine thousand of the sulfide, gave equivalent results. Since 100 per cent kill was obtained with all three derris-thiuram sulfide sprays, it is evident that still greater dilutions may be effectively employed. Since, however, aphids do not present any special problem of control, I prefer further to illustrate the effect of the thiuram sulfides on the toxicity of derris and other rotenone insecticides with reference to the more resistant red spider.

The promising results indicated by the above tests were confirmed in the field. In one case 150 rose plants infested with red spiders, aphids, and mildew were sprayed with a combination of derris at 1-400 and tetraethylthiuram monosulfide (emulsion) 1-3200. One hundred per cent of the aphids (Macrosiphum rosae Linné) and 99 per cent of the red spiders were killed and the mildew was checked. In another case a mixture of derris at 1-400 and tetraethylthiuram monosulfide (emulsion) at 1-6400 was applied by a grower to an entire range of roses in his greenhouse. When applied under pressure of 300 pounds this combination cleaned up the infestation completely without any foliage injury. When reinfestation occurred the following fall, cube at 1-400 was substituted for the derris and the same excellent control was obtained, notwithstanding the fact that cube is known to be less toxic than derris. The plants so sprayed had only a few scattered living red spiders after two weeks and no reinfestation was observed within a period of three weeks.

In preparing sprays for field application it is desirable to incorporate the derris and the thiuram sulfide into a single dispersible composition. These compositions may be prepared either in the form of dispersible powders or thick pastes, the latter being desirable when the derris is incorporated in emulsions of the thiuram sulfide dissolved in oil. A fluid mixture should be avoided since the derris tends to settle out. Thick pastes of this type are of special interest since, as already pointed out, insoluble oils also improve the toxicity of the derris.

In this connection the thiuram sulfides have been observed to assert a favorable influence on the manner in which the derris disperses. When the thiuram sulfide is incorporated with the derris in the manner described above or in the manner as will be presently described, aqueous dispersions are more readily obtainable probably due to the fact that the heavier thiuram sulfide particles tend to drag the light, fluffy derris particles into the dispersion medium.

I have found further that the advantages due to the use of oils may be obtained to a marked degree by simply mixing derris powder with an oil or an oil solution of a thiuram sulfide in proportions such that the resulting composition is dry enough easily to be handled and weighed. A further advantage is obtained in that a dispersing or emulsifying agent is not essential. The saponin in the derris powder apparently performs this function. The proper amount of spreader and sticker, for example, about 2 per cent by weight, may also be incorporated without such compositions becoming too wet and sticky to be handled and weighed. These compositions and their effectiveness in controlling red spider are illustrated in the following example:

EXAMPLE 5

In the following tests, as illustrated in Tables VII and VIII, derris was mixed with tetraethylthiuram monosulfide alone and with tetraethylthiuram monosulfide dissolved in an equal quantity of coconut oil in the proportions indicated under concentration. Two per cent by weight of the spreader and sticker described above was included in the dry mixture and dispersed in water to give sprays having concentrations of 1–400 and 1–800. For comparative purposes a spray was also prepared by dispersing the emulsion described in Example 1 in an aqueous suspension of derris to give a comparable spray composition. In each of these sprays the spreader and sticker was added as required to give one part in two thousand.

TABLE VII
Red spider on bean plants

| Composition | Concentration | | | Per cent kill | Relative concentration |
|---|---|---|---|---|---|
| | Derris | Oil | Sulfide | | |
| Derris | 9–3600 | | | 19 | 16 |
| Do | 7–3600 | | | | |
| Tetraethylthiuram monosulfide | | | 2–3600 | 62 | 16 |
| Derris | 7–3600 | | | | |
| Coconut oil | | 1–3600 | | 94 | 16 |
| Tetraethylthiuram monosulfide | | | 1–3600 | | |

TABLE VIII
Red spider on bean plants

| Composition | Concentration | | | Per cent kill | Relative concentration |
|---|---|---|---|---|---|
| | Derris | Oil | Sulfide | | |
| Derris | 1–200 | | | 53 | 32 |
| Do | 1–400 | | | 47 | 16 |
| | 18–7200 | | | | |
| | 20–8000 | | | | |
| | 19–7600 | | | | |
| Do | 7–7200 | | | | |
| Coconut oil | | 1–7200 | | 97 | 8 |
| Tetraethylthiuram monosulfide | | | 1–7200 | | |
| Derris | 7–8000 | | | | |
| Coconut oil | | 1.5–8000 | | 90 | 8 |
| Tetraethylthiuram monosulfide | | | 1.5–8000 | | |
| Derris | 7–7600 | | | | |
| Coconut oil | | 1.25–7600 | | 92 | 8 |
| Tetraethylthiuram monosulfide | | | 1.25–7600 | | |
| Derris | 7–8000 | | | | |
| Coconut oil | | 1.5–8000 | | 74 | 8 |
| Tetraethylthiuram monosulfide (emulsion) | | | 1.5–8000 | | |

It may be noted that in every instance a marked increase was obtained by the addition of the thiuram sulfide, even when the derris is reduced to less than one part in one thousand. The beneficial effect of the oil also is clearly demonstrated. While the per cent of kill is somewhat lower than indicated in some of the previous examples, this may be attributed in part to the small concentration of toxins in the spray and in part to the particular biological conditions obtaining. The particular merit of these compositions, however, is clearly shown in comparison with the last composition which in itself, as illustrated in Examples 1 and 2, has proved exceptionally effective.

EXAMPLE 6

The tests illustrated in the following table show the effect of various oils on the toxicity of derris and the effect of replacing the oil with the corresponding oil solution of tetraethylthiuram monosulfide. Each composition was prepared in the form of a dry dispersible powder in the same manner as described in Example 5 and dispersed in water in the concentrations indicated.

TABLE IX
Red spider on bean plants

| Composition | Concentration | | | Per cent kill | Relative concentration |
|---|---|---|---|---|---|
| | Derris | Oil | Sulfide | | |
| Derris | 16–6400 | | | 35 | 16 |
| | 8–6400 | | | 18 | 8 |
| Do | 8–6400 | | | | |
| Sulfonated castor oil | | 8–6400 | | 27 | 16 |
| Derris | 8–6400 | | | | |
| Sulfonated castor oil | | 4–6400 | | 89 | 16 |
| Tetraethyl thiuram monosulfide | | | 4–6400 | | |
| Derris | 8–6400 | | | | |
| Castor oil | | 4–6400 | | 73 | 12 |
| Derris | 8–6400 | | | | |
| Castor oil | | 2–6400 | | 47 | 10 |
| Derris | 8–6400 | | | | |
| Castor oil | | 2–6400 | | 80 | 12 |
| Tetraethylthiuram monosulfide | | | 2–6400 | | |
| Derris | 8–6400 | | | | |
| Coconut oil | | 4–6400 | | 60 | 12 |
| Derris | 8–6400 | | | | |
| Coconut oil | | 2–6400 | | 52 | 10 |
| Derris | 8–6400 | | | | |
| Coconut oil | | 2–6400 | | 81 | 12 |
| Tetraethylthiuram monosulfide | | | 2–6400 | | |
| Derris | 8–6400 | | | | |
| Coconut oil | | 1–6400 | | 67 | 10 |
| Tetraethylthiuram monosulfide | | | 1–6400 | | |

These tests show that the water insoluble oils are much more effective in increasing the toxicity of derris than the soluble oils such as sulfonated castor oil, and that replacement of the oil by the corresponding oil solution of tetraethylthiuram monosulfide gives a still further increase in the toxicity of the derris.

The excellent results obtained with mixtures of thiuram sulfides and ground derris or cube suggested the use of rotenone extract. The same relative improvement in the toxicity of the rotenone insecticide was observed in this instance as illustrated in the following example:

EXAMPLE 7

A camphor oil extract containing 5 per cent rotenone and 20 per cent total extractives was tested in combination with tetra ethyl thiuram monosulfide. Emulsions were prepared by dissolving the camphor oil extract and the tetraethylthiuram monosulfide in coconut oil and emulsifying the resulting solution with solubilized casein. Emulsions containing 50 per cent active ingredients (camphor oil extract, coconut oil, and tetraethylthiuram monosulfide) were used as base compositions and diluted to the desired degree. The following table illustrates the relative results obtained on bean plants infested with red spider:

TABLE X
Red spider on bean plants

| Composition | Concentration | | | Per cent kill | Relative concentration |
|---|---|---|---|---|---|
| | Extract | Oil | Sulfide | | |
| Rotenone extract, 25%<br>Coconut oil, 25% | 8-4000<br>4-4000<br>2-4000 | 8-4000<br>4-4000<br>2-4000 | | 100<br>96<br>68 | 25.6<br>12.8<br>6.4 |
| Rotenone extract, 25%<br>Coconut oil, 12.5%<br>Tetraethylthiuram monosulfide, 12.5% | 2-4000 | 1-4000 | 1-4000 | 96 | 6.4 |
| Rotenone extract, 12.5%<br>Coconut oil, 25%<br>Tetraethylthiuram monosulfide, 12.5% | 1-4000 | 2-4000 | 1-4000 | 95 | 6.4 |

From the foregoing table it will be apparent that the thiuram sulfide at 1–4000 increased the effectiveness of the rotenone extract at 1–2000 from 68 per cent to 96 per cent. This amounts substantially to doubling the effectiveness of the rotenone since the per cent kill is equal to that obtained with twice the quantity of rotenone.

EXAMPLE 8

In this example a paraffin oil (65 seconds Saybolt) solution of the rotenone extract containing piperidine oleate to render the solution self-dispersible was used in preparing the spray. In one case castor oil was added to make 25 per cent by weight of the composition, and in the other a like amount of a 50 per cent solution of tetraethylthiuram monosulfide in castor oil. The tests were also repeated in the same manner with coconut oil. Since all the components of the insecticide were oils or of an oily nature the insecticidal action attributable to the oils was overcome and the value of the thiuram sulfide clearly indicated. The following table is illustrative:

TABLE XI
Red spider on bean plants

| Composition | Concentration | Per cent killed |
|---|---|---|
| Rotenone extract, 25%<br>Castor oil, 25%<br>Paraffin oil, 20%<br>Piperidine oleate, 30% | 2-12000<br>2-12000<br>1.6-12000<br>2.4-12000 } 8-12000 (1-1500) | 43 |
| Rotenone extract, 25%<br>Castor oil, 12.5%<br>Tetraethylthiuram monosulfide, 12.5%<br>Paraffin oil, 20%<br>Piperidine oleate, 30% | 2-12000<br>1-12000<br>1-12000<br>1.6-12000<br>2.4-12000 } 8-12000 | 73 |
| Rotenone extract, 25%<br>Coconut oil, 25%<br>Paraffin oil, 20%<br>Piperidine oleate, 30% | 2-12000<br>2-12000<br>1.6-12000<br>2.4-12000 } 8-12000 | 46 |
| Rotenone extract, 25%<br>Coconut oil, 12.5%<br>Tetraethylthiuram monosulfide, 12.5%<br>Paraffin oil, 20%<br>Piperidine oleate, 30% | 2-12000<br>1-12000<br>1-12000<br>1.6-12000<br>2.4-12000 } 8-12000 | 66 |

The above compositions were tested in very dilute sprays (1–1500) in order to avoid any possible masking of the effects of the thiurum sulfide. No spreader and sticker was used. It is significant to note that in the castor oil spray as little as one part in 12000 of the thiuram sulfide increased the per cent kill by thirty per cent, and that in case of the coconut oil spray the same amount of the thiuram sulfide increased the kill from 46 to 66. These results are especially significant since at 1–12000 the thiuram sulfide has no measurable effect on red spider.

The remarkable effect of the thiuram sulfide in increasing the toxicity of rotenone insecticides is not confined to such substance alone as similarly good results were obtained with ground pyrethrum flowers and pyrethrum extracts. The effect of the tetraethylthiuram monosulfide on the toxicity of pyrethrum is illustrated in the following examples:

EXAMPLE 9

In this example tetraethylthiuram sulfide prepared as a coconut oil emulsion as described in Example 1 was mixed with ground pyrethrum flowers and tested on *Aphis rumicis* on nasturtiums. The results as compared with the ground pyrethrum flowers and the thiuram sulfide alone are given in the following table:

TABLE XII
Aphids on nasturtium plants

| Composition | Concentration | | | Per cent kill | Relative concentration |
|---|---|---|---|---|---|
| | Pyrethrum | Oil | Sulfide | | |
| Coconut oil<br>Tetraethylthiuram monosulfide | | 2-4000 | 2-4000 | 58 | |
| Ground pyrethrum flowers<br>Ground pyrethrum flowers<br>Ground pyrethrum flowers | 8-4000<br>4-4000<br>4-4000 | | | 98<br>71 | |
| Coconut oil<br>Tetraethylthiuram monosulfide | | 1-4000 | 1-4000 | 96 | |

These data show that the addition of tetraethylthiuram monosulfide at 1–4000 to pyrethrum flowers at 1–1000 increased the per cent of kill from 71 to 96. The latter figure is substantially the same as that for ground pyrethrum flowers at 1–500. In other words, the toxicity of the ground pyrethrum flowers was substantially doubled by the addition of tetraethylthiuram monosulfide at 1–4000.

EXAMPLE 10

Fly spray tests were also carried out with tetraethylthiuram monosulfide and pyrethrum extracts in kerosene solutions. These tests were carried out in standard Peet-Grady chambers. The following table illustrates the results obtained:

TABLE XIII

| Composition | Concentration* Pyrethrum | Concentration* Sulfide | Percent down | Percent kill |
|---|---|---|---|---|
| Tetramethylthiuram disulfide | | 1.3 | 5 | 0 |
| Pyrethrum | 25 | | 85 | 33 |
| Tetramethylthiuram disulfide | | 0.5 | | |
| Tetramethylthiuram monosulfide | | 1.7 | 11 | 3 |
| Pyrethrum | 25 | | 82 | 47 |
| Tetramethylthiuram monosulfide | | 0.5 | | |
| Tetraethylthiuram monosulfide | | 2.0 | 24 | 5 |
| Pyrethrum | 25 | | 86 | 33 |
| Tetraethylthiuram monosulfide | | 0.5 | | |
| Pyrethrum | 25 | | 70 | 21 |
| Do | 125 | | 98 | 52 |

*Pyrethrum content is given in milligrams of total pyrethrins per 100 cubic centimeters and the sulfide content in percent.

From the above data it will be apparent that, notwithstanding the relative ineffectiveness of the thiuram sulfides alone, even when employed in saturated solutions, substantial improvement in the toxicity of the pyrethrum is obtained both in the number of flies which are down at the end of ten minutes and the number of flies dead at the end of twenty-four hours.

While I have described my invention in detail and illustrated the numerous advantages thereof, it is to be understood that my invention is not limited in these respects but that such variation in the nature and proportions of the ingredients, the manner in which they are associated and applied as come within the spirit of the invention are intended to be included within the scope of the appended claims.

I claim:

1. A composition of matter selected from the group consisting of rotenone and pyrethrum insecticides having incorporated therein a thiuram sulfide.

2. A composition of matter selected from the group consisting of rotenone and pyrethrum insecticides having incorporated therein an oil-soluble thiuram sulfide and an oil.

3. A composition of matter selected from the group consisting of rotenone and pyrethrum insecticides having incorporated therein tetraethylthiuram monosulfide.

4. A composition of matter comprising a rotenone insecticide having incorporated therein a thiuram sulfide.

5. A composition of matter comprising a rotenone insecticide having incorporated therein an oil-soluble thiuram sulfide and an oil.

6. A composition of matter comprising a rotenone insecticide having incorporated therein tetraethylthiuram monosulfide.

7. A composition of matter comprising a rotenone insecticide having incorporated therein tetraethylthiuram monosulfide dissolved in a water-insoluble oil.

8. A composition of matter comprising powdered rotenone insecticide having incorporated therein an oil-soluble thiuram sulfide dissolved in a water-insoluble oil in proportions to provide a dry, free-flowing, dispersible powder.

9. A composition of matter comprising powdered rotenone insecticide having incorporated therein an oil-soluble thiuram sulfide dissolved in a vegetable oil in proportions to provide a dry, free-flowing, dispersible powder.

10. A composition of matter comprising powdered rotenone insecticide having incorporated therein tetraethylthiuram monosulfide.

HUBERT G. GUY.